(12) United States Patent
Wardman et al.

(10) Patent No.: US 10,311,434 B2
(45) Date of Patent: Jun. 4, 2019

(54) SYSTEMS AND METHODS FOR REPORTING COMPROMISED CARD ACCOUNTS

(71) Applicant: PayPal, Inc., San Jose, CA (US)

(72) Inventors: Brad Wardman, Phoenix, AZ (US); Jeffrey Alan Edelen, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 720 days.

(21) Appl. No.: 14/290,865

(22) Filed: May 29, 2014

(65) Prior Publication Data
US 2015/0347965 A1   Dec. 3, 2015

(51) Int. Cl.
| | |
|---|---|
| *G06Q 20/20* | (2012.01) |
| *G06Q 20/40* | (2012.01) |
| *G06Q 10/10* | (2012.01) |
| *G06Q 10/06* | (2012.01) |
| *G06Q 50/26* | (2012.01) |

(52) U.S. Cl.
CPC ....... *G06Q 20/401* (2013.01); *G06Q 10/0635* (2013.01); *G06Q 10/10* (2013.01); *G06Q 20/4016* (2013.01); *G06Q 50/265* (2013.01); *Y04S 10/54* (2013.01)

(58) Field of Classification Search
CPC ............ G06Q 20/401; G06Q 20/4016; G06Q 10/0635; G06Q 50/265; G06Q 20/382
See application file for complete search history.

(56) References Cited

U.S. PATENT DOCUMENTS

| | | | | |
|---|---|---|---|---|
| 8,276,814 | B1* | 10/2012 | Davis | G06Q 20/349 235/375 |
| 8,527,427 | B2* | 9/2013 | Wankmueller | G06Q 20/40 235/379 |
| 8,800,868 | B1* | 8/2014 | Davis | G06Q 20/24 235/380 |
| 8,840,016 | B1* | 9/2014 | Schott | G06Q 40/00 235/379 |
| 2002/0143655 | A1* | 10/2002 | Elston | G06Q 20/02 705/26.81 |
| 2003/0014372 | A1* | 1/2003 | Wheeler | G06F 21/32 705/71 |
| 2003/0126094 | A1* | 7/2003 | Fisher | G06Q 20/02 705/75 |
| 2005/0080728 | A1* | 4/2005 | Sobek | G06Q 20/04 705/39 |
| 2008/0154770 | A1* | 6/2008 | Rutherford | G06Q 20/04 705/44 |

(Continued)

*Primary Examiner* — Matthew S Gart
*Assistant Examiner* — Stephen S Swartz
(74) *Attorney, Agent, or Firm* — Haynes & Boone, LLP

(57) ABSTRACT

A system or method is provided to generate and send a notification to a card issuing bank to report a compromised card. In particular, the notification may be embedded in a pseudo card transaction message based on the ISO 8583 protocol message format. Card issuing banks may be a participant in a compromised card account reporting program to receive the notifications via the ISO 8583 transaction messages from a merchant or a payment service provider. In particular, data elements within the ISO 8583 protocol that are not reserved for carrying information for a transaction may be designated to carry information for reporting the compromised card account. Thus, merchants or payment service providers may send notifications of compromised card accounts to card issuing banks in a secured manner using ISO 8583 transaction messages.

20 Claims, 4 Drawing Sheets

(56) References Cited

U.S. PATENT DOCUMENTS

| | | | |
|---|---|---|---|
| 2008/0203170 A1* | 8/2008 | Hammad | G06K 17/00 235/492 |
| 2010/0063903 A1* | 3/2010 | Whipple | G06Q 20/40 705/30 |
| 2010/0191605 A1* | 7/2010 | Nuttall | G06Q 20/10 705/17 |
| 2011/0126264 A1* | 5/2011 | Dunstan | G06Q 10/06 726/3 |
| 2011/0238564 A1* | 9/2011 | Lim | G06Q 20/3223 705/38 |
| 2012/0191525 A1* | 7/2012 | Singh | G06Q 30/0226 705/14.33 |
| 2013/0054468 A1* | 2/2013 | Fuentes | G06Q 40/02 705/64 |
| 2013/0103578 A1* | 4/2013 | Mallean | G06Q 30/02 705/39 |
| 2013/0138563 A1* | 5/2013 | Gilder | G06Q 20/4016 705/44 |
| 2014/0052999 A1* | 2/2014 | Aissi | G06F 21/64 713/189 |
| 2014/0208394 A1* | 7/2014 | Goodwin | H04L 63/102 726/4 |
| 2014/0236790 A1* | 8/2014 | Smith | G06Q 40/02 705/35 |
| 2014/0250011 A1* | 9/2014 | Weber | G06Q 20/4016 705/44 |
| 2015/0095239 A1* | 4/2015 | Specogna | G06Q 20/3224 705/72 |
| 2015/0161724 A1* | 6/2015 | Chace | G06Q 20/28 705/44 |

* cited by examiner

SYSTEMS AND METHODS FOR REPORTING COMPROMISED CARD ACCOUNTS

BACKGROUND

Field of the Invention

The present invention generally relates to systems and methods for reporting compromised card accounts.

Related Art

With the proliferation of electronic commerce, more financial transactions are made via card accounts. Merchants who accept payments via card accounts may discover card accounts that have been compromised, e.g., a stolen card, a stolen identity, or etc. Typically, when a merchant realizes that a particular card account has been compromised, the merchant may flag the compromised card account to restrict transactions via the compromised card account. Nevertheless, due to privacy concerns or regulation, the merchant is not able to notify the account user of the compromised card account or the issuing bank of the card account regarding the compromised card accounts. Because the account user is not notified, the account user may be frustrated when the account user attempts to use the compromised card account to pay for a purchase and the payment transaction is rejected. Further, the issuing bank of the compromised card account may incur more risk or cost, because the issuing bank is not notified of the compromised card account in time to take action to prevent loss. Therefore, there is a need for a system or method that facilitates reporting of compromised card accounts.

Figure 1:
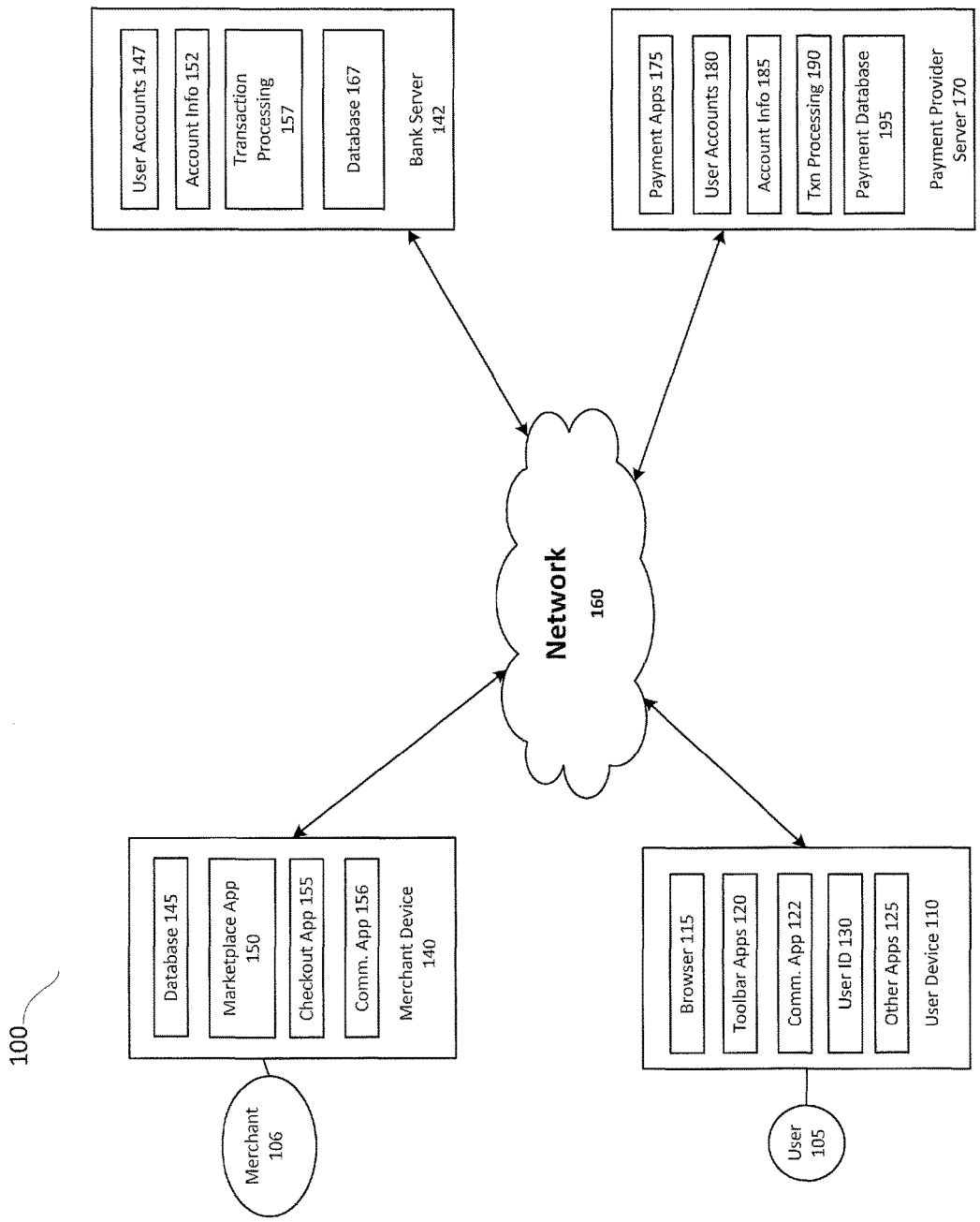
FIG. 1 is a block diagram of a networked system suitable for implementing a process for reporting a compromised card account according to an embodiment.

Embodiments of the present disclosure and their advantages are best understood by referring to the detailed description that follows. It should be appreciated that reference numerals are used to identify respective elements illustrated in one or more of the figures, wherein showings therein are for purposes of illustrating embodiments of the present disclosure and not for purposes of limiting the same.

DETAILED DESCRIPTION

According to an embodiment, a system or method is provided to generate and send a notification to a card issuing bank to report a compromised card. In particular, the notification may be embedded in a pseudo card transaction message based on the ISO8583 protocol message format. Card issuing banks may participate in this compromised card reporting program to receive the notifications via the ISO8583 transaction messages from a merchant or a payment service provider. Thus, card issuing banks may be notified of compromised card accounts and may take appropriate actions to prevent loss.

In an embodiment, data elements within the ISO8583 protocol that are not reserved for carrying information regarding a transaction may be designated to carry information for reporting the compromised card account. In particular, one of the bitmap fields in an ISO8583 transaction message may be designated as an indicator that the transaction message contains information reporting a compromised card account. Different data elements may be designated to indicate different types of issues regarding the compromised card account. Thus, merchants or payment service providers may send notifications of compromised card accounts to card issuing banks in a secured manner using ISO8583 transaction messages.

In an embodiment, when a card issuing bank receives an ISO8583 transaction message, the card issuing bank may check a designated bitmap field of the transaction message to determine whether the received ISO8583 transaction message contains information reporting a compromised card account. If so, the card issuing bank may check the designated data elements of the transaction message to extract information regarding the compromised card account, such as the account number, the type of issue, the source of discovery, the level of risk, and the like. Based on the information, the card issuing bank may take appropriate actions to prevent loss.

In an embodiment, the card issuing banks may send a responding ISO8583 transaction message back to the merchant or the payment service provider to confirm that the information reporting the compromised card account is received. The card issuing banks may begin to take appropriate actions to prevent loss, such as restricting further use of the compromised card account and/or notify users of the compromised card account. The merchant or payment provider server also may take appropriate actions based on the responses received from the card issuing banks. For example, if the merchant or the payment provider server receives confirmation from the card issuing bank indicating that the information reporting the compromised card account has been received, the merchant or the payment provider server may remove usage restrictions on the compromised card account, because the merchant or the payment provider server has passed the liability to the card issuing bank by notifying the card issuing bank. On the other hand, if the merchant or the payment provider server does not receive confirmation from the card issuing bank indicating that the information reporting the compromised card account has been received, the merchant or the payment provider server may continue to impose restrictions on the compromised card account at the merchant or at the payment service provider.

FIG. 1 is a block diagram of a networked system 100 suitable for implementing a process for reporting compromised card accounts according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a merchant device 140, a payment provider server 170, a bank server 142, and a user device 110 in communication over a network 160. Payment provider server 170 may be maintained by a payment service provider, such as PayPal, Inc. of San Jose, Calif. A user 105 or a merchant 106 may utilize user device 110 or merchant device 140 to perform payment transactions using payment provider server 170. A user 105 may utilize user device 110 to initiate a payment transaction, receive a transaction approval request, or reply to the request. Note that transaction, as used herein, refers to any suitable fund transaction, including payments, transfer of information, display of information, etc. For example, the account user may initiate a deposit into a saving account at a bank. In another aspect, a merchant 106 may use a merchant device 140 to initiate a payment transaction, receive a transaction approval request, or reply to the request. For example, when the user 105 makes a purchase from the merchant 106, the payment transaction for the purchase may be initiated by either the merchant 106 using the merchant device 140 or the user 105 using the user device 110.

User device 110, merchant device 140, payment provider server 170, and bank server 142 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over the network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication in the system 100. For example, in one embodiment, the user device 110 may be implemented as a personal computer (PC), a smart phone, wearable device, laptop computer, and/or other types of computing devices capable of transmitting and/or receiving data, such as an iPad™ or an iPhone™ from Apple™.

The user device 110 may include one or more browser applications 115 which may be used, for example, to provide a convenient interface to permit user 105 to browse information available over the network 160. For example, in one embodiment, browser application 115 may be implemented as a web browser configured to view information available over the network 160, such as a user account for setting up a shopping list and/or merchant sites for viewing and purchasing products and services. User device 110 may also include one or more toolbar applications 120 which may be used, for example, to provide client-side processing for performing desired tasks in response to operations selected by the user 105. In one embodiment, toolbar application 120 may display a user interface in connection with browser application 115.

The user device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over the network 160, or other types of applications.

Applications 125 may also include email, texting, voice and IM applications that allow user 105 to send and receive emails, calls, and texts through the network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider.

User device 110 may include a communications application 122, with associated interfaces, enables user device 110 to communicate within system 100. For example, the communications application 112 may be configured to manage and implement wired communication, such as Ethernet communication and/or telephone landline communication, and wireless communication, such as WiFi communication, Bluetooth communication, cellular voice and/or data communication, Near-Field Communication (NFC), and the like.

Merchant device 140 may be maintained, for example, by a merchant or seller offering various products and/or services. The merchant may have a physical point-of-sale (POS) store front. The merchant may be a participating merchant who has a merchant account with the payment service provider. Merchant device 140 may be used for POS or online purchases and transactions. Generally, merchant device 140 may be maintained by anyone or any entity that receives money, which includes charities as well as banks and retailers. For example, a payment may be a donation to charity or a deposit to a saving account.

Merchant device 140 may include a database 145 identifying available products (including digital goods) and/or services (e.g., collectively referred to as items) which may be made available for viewing and purchase by user 105. Accordingly, merchant device 140 also may include a marketplace application 150 which may be configured to serve information over the network 160 to browser 115 of user device 110. In one embodiment, user 105 may interact with marketplace application 150 through browser applications over the network 160 in order to view various products, food items, or services identified in database 145.

Merchant device 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over the network 160. For example, checkout application 155 may receive and process a payment confirmation from payment service provider server 170, as well as transmit transaction information to the payment provider and receive information from the payment provider via the network 160. Checkout application 155 may be configured to receive payment via a plurality of payment methods including cash, credit cards, debit cards, checks, money orders, or the like.

Merchant device 140 may include a communications application 156, with associated interfaces, enables merchant device 140 to communicate within system 100. For example, the communications application 156 may be configured to manage and implement wired communication, such as Ethernet communication and/or telephone landline communication, and wireless communication, such as WiFi communication, Bluetooth communication, cellular voice and/or data communication, Near-Field Communication (NFC), and the like.

Payment provider server 170 may be maintained, for example, by an online payment service provider which may provide payment between user 105 and the operator of merchant device 140. In this regard, payment provider server 170 may include one or more payment applications 175 which may be configured to interact with user device 110 and/or merchant device 140 over the network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant device 140 on behalf of user 105 during a transaction with checkout application 155 to track and manage purchases made by users and which and when funding sources are used.

A transaction processing application 190, which may be part of payment application 175 or separate, may be configured to receive information from user device 110 and/or merchant device 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

In an embodiment, payment provider server 170 may maintain a list of compromised card accounts. The list of compromised card accounts may be collected through various security monitoring and cyber-intelligence gathering. For example, by monitoring and analyzing various transactions processed through the payment provider server 170, the payment provider server 170 may determine certain irregularities and may identify certain card accounts that may potentially be compromised. Compromised card accounts also may be discovered from phishing website or malicious botnet traffic. The payment provider server 170 may maintain and continuously update the list of compromised card accounts and may place restrictions on these compromised card accounts.

Bank server 142 may be maintained, for example, by a bank or a financial institution offering fund transaction services. The bank may have a physical point-of-sale (POS) store front. The bank may be a card issuing bank that issues and sets up card accounts for customers. Bank server 142 may be used for POS or online purchases and transactions. Generally, bank server 142 may be maintained by anyone or any entity that performs fund transfers. Bank server 142 may include card accounts 147 associated with users registered to conduct transactions using a card issued by the bank. The card may be a credit card, a debit card, a gift card, and the like. The users may include individuals, companies, organizations, merchants, and etc. Each of card accounts 147 may include account information 152 associated with each account user. Account information 152 may include private financial information of each account user, such as account numbers, passwords, user names, phone numbers, or other financial information which may be used to facilitate banking by a user.

Bank server 142 also may include a transaction processing unit 157 configured to process fund transfers. In particular, transaction processing unit 157 may send funds from a card account to another account within or outside the bank. For example, transaction processing unit 157 may receive a request for payment using a card account. Bank server 142 may have a database 167 configured to store previous transactions. In particular, records of transactions may be stored at database 167 for record keeping purposes. Database 167 also may store a list of compromised card accounts. The bank may place restrictions to these compromised card accounts.

Figure 2:
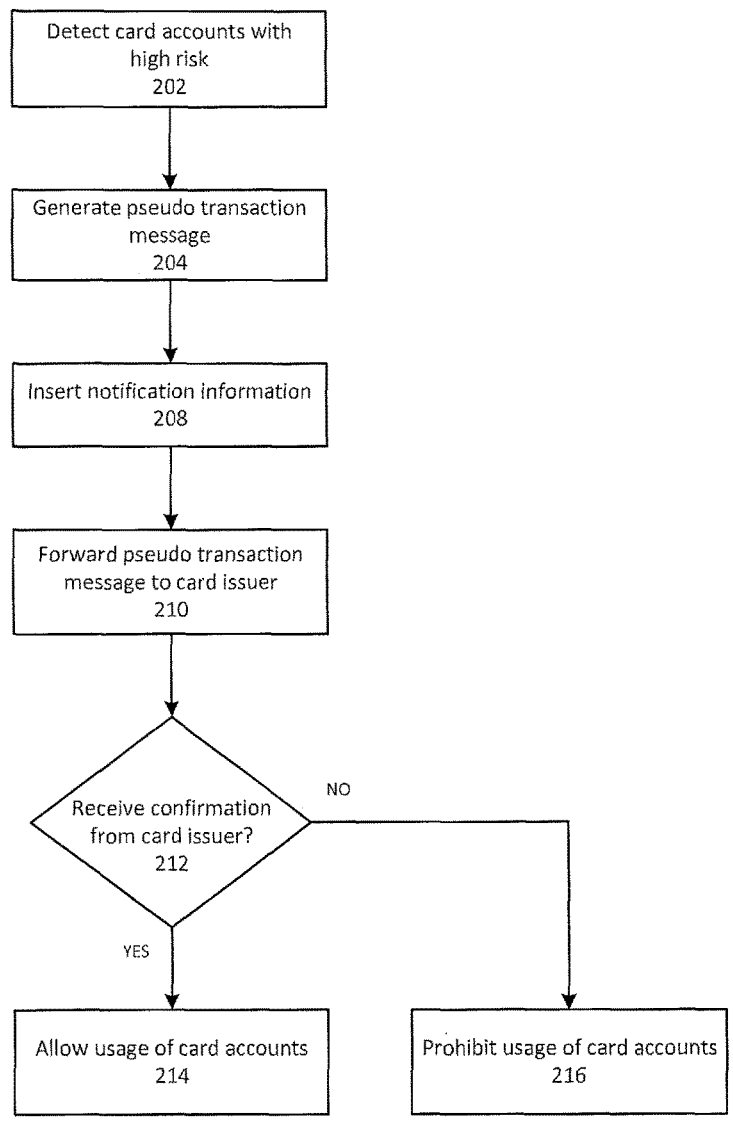
FIG. 2 is a flowchart showing a process for reporting a compromised card account according to one embodiment.

FIG. 2 is a flowchart showing a process 200 for reporting a compromised card account according to one embodiment. Process 200 may be executed by devices or servers of merchants or payment service providers that are participants to the compromised card account reporting program. For example, merchant device 140 or payment provider server 170 may execute process 200 to report a compromised card account to bank serve 142. At step 202, a card account with high risk of being compromised or has been compromised may be discovered by the merchants or the payment service provider. A compromised card account may have private or secured information, such as account number, user ID, passcode, or the like, that have been stolen or accessed by an unauthorized person. A compromised card account may also have a physical card that has been stolen.

Compromised card accounts may be discovered in various manners. For example, a user of a card account may notify the merchant or the payment service provider that a card has been compromised. The card may be a payment card, a gift card, a credit card, a debit card, a membership card, or any card associated with a card account issued at a card issuing bank or card issuing service. In another example, the merchant or the payment service provider may perform cyber-intelligence gathering from external sources, such as monitoring botnet traffic, phishing websites, online blog posts, and the like. These external sources may reveal card accounts that have been compromised by data breach, identity theft, or the like. In still another example, transactions processed through the merchant or the payment service provider may be monitored and analyzed to detect irregularities and to identify card accounts that may have been compromised.

Card accounts that may have been compromised or that actually have been compromised may be collected. Restrictions may be imposed on these card accounts based on their risk levels. For example, if a card account has a high probability that it has been compromised, the merchants or the payment service provider may restrict all transactions using this card account. If a card account has a moderate probability that it has been compromised, the merchants or the payment service provider may restrict usage of this card account to certain geographically area, such as a certain distance from the user's address. If a card account has a low probability that it has been compromised, the merchants or the payment service provider may allow the usage of the card account and may continue to monitor transactions or activities associated with the card account.

In an embodiment, when a card account has a risk level that reaches a certain threshold, the card account may be selected to be reported to the card issuing bank. For example, a risk score may be calculated based on the probability that the card account has been compromised. When the risk score reaches a predetermined level, the card account may be reported to the card issuing bank. The predetermined level may be set by the merchant or the payment service provider. In another embodiment, the predetermined level may be set by the card issuing bank or agreed upon between the payment service provider and the card issuing bank.

When a card account is to be reported, the merchant or payment service provider may generate a pseudo transaction message at step 204. The reporting of the compromised card account may be embedded in the pseudo transaction message. The pseudo transaction message may have an ISO 8583 message format. The pseudo transaction message may appear to be a regular or normal ISO 8583 transaction message that is configured to request transaction approval from the card issuing bank. In an embodiment, the pseudo transaction message may be a transaction request of a zero amount. As such, the pseudo transaction message may be a dummy message that merely carries a report of a compromised card account without requesting a transaction approval from the card issuing bank.

An ISO 8583 transaction message is a financial transaction card originated message. It is the International Organization for Standardization standard exchanging electronic transactions made by cardholders using payment cards. When a user makes a payment using a card account at a point-of-sale terminal, an online website, or an automated teller machine (ATM), an ISO 8583 transaction message for the payment request is generated and forwarded to a card issuing bank or system. The card issuing bank may authenticate and authorize the payment request based on the card account. The ISO 8583 transaction message may include the card account number, the terminal ID, e.g., the payee or the merchant's account number, the amount of transaction, and the like. If authentication is successful and the card account is eligible to make the payment, the card issuing bank may send a responding ISO 8583 transaction message indicating that the transaction is approved. On the other hand, if the authentication is not successful or the card account is not eligible to make the payment, the card issuing bank may send a responding ISO 8583 transaction message indicating that the transaction is declined. The merchant or the payment service provider may then process the transaction based on whether the card payment has been approved.

An ISO 8583 transaction message typically includes three parts: the message type indicator (MTI), bitmaps, and data elements. The MTI may indicate the type of transaction message. The MTI may include a four (4) digit numeric field. The first digits of the MTI may indicate the version of the transaction message. For example, a "0" in the first digit of the MTI may indicate that the transaction message is a 1987 version of the message while a "2" in the first digit of the MTI may indicate that the transaction message is a 2003 version of the message. The second digit of the MTI may indicate the overall purpose of the transaction message. For example, a "1" in the second digit of the MTI may indicate that the transaction message is an authorization message for determining if funds are available to get an approval while a "4" in the second digit of the MTI may indicate that the transaction message is for reversing the action of a previous authorization or chargeback.

The third digit of the MTI may indicate the function of the transaction message. The function of the transaction message may define how the transaction message should be forwarded. For example, a "0" in the third digit of the MTI may indicate that the transaction message is a request while a "1" in the third digit of the MTI may indicate that the transaction message is a request response. The fourth digit of the MTI may indicate the source of the message within the payment system or payment chain. For example, a "0" in the fourth digit of the MTI may indicate that the transaction message is originated from an acquirer while a "2 in the fourth digit of the MTI may indicate that the transaction message is originated from an issuer.

Accordingly, the MTI of a transaction message may specify the function of the transaction message, how the transaction message is to be forwarded, and the origination of the transaction message. For example, a transaction message with an MTI code of "0100" is an authorization request for requesting a payment from a point-of-sale (POS) terminal for authorizing a purchase using a card account. In another example, a transaction message with an MTI code of "0110" is an issuer response to a point-of-sale terminal's request for a payment using a card account.

An ISO 8583 transaction message also may include a bitmap field. The bitmap field may indicate which of the data elements in the transaction message contain information. The bitmap field may include a plurality of ones and/or zeros to indicate which data element contains information. A "one" in a bit may indicate that the corresponding data element contains information while a "zero" in a bit may indicate that the corresponding data element does not contain information. For example, a bitmap of "82" may translate to a binary code of "1000 0010." This bit map may indicate that data fields 1 and 7 contain information while data fields 2, 3, 4, 5, 6, and 8 do not contain information.

An ISO 8583 also may include data elements. Data elements are individual fields carrying transaction information, such as card account number, transaction amount, transaction date and time, merchant type, and the like. There may be 192 different data element fields with some of the fields designated for specific information and some of the fields are not used but reserved for future uses. As such, one or more of the reserved data element fields that are not used for carrying transaction information may be used or designated for carrying information for reporting compromised card accounts.

At step 208, the merchant or the payment service provider may insert information for reporting the compromised card account into the pseudo transaction message. The pseudo transaction message may be an ordinary request for transaction approval to the card issuing bank. For example, the pseudo transaction message may include an MTI of "0100" indicating that the pseudo transaction message is a request from a POS terminal for authorization of a cardholder's purchase. The pseudo transaction message also may have a bitmap providing a map of the location of information in the pseudo transaction. For example, the bitmap of the pseudo transaction message may indicate there is information at data field 2 at which the account number of a compromised card account is provided. One or more of the unused data element fields may be designated for carrying information for reporting the compromised card account. As such, the bitmap also may indicate that one or more of the unused data element fields contain information.

One or more of the unused or reserved data element fields, such as data field number 55-63, 105-112, 114-123, and 127, may be selected to carry information for reporting the compromised card account. The card issuing bank, the merchants, and the payment service provider may agree on a convention regarding which data element fields are for what reporting information. For example, data field number 60 may be selected and agreed upon by the parties to carry information regarding the type of card compromise. Different types of compromise, such as stolen card, stolen identity, mass data breach, or the like, may be indicated by different codes and may be stored at data field number 60. Data field number 100 may be selected and agreed on by the parties to carry the source where the compromise was discovered. Different sources, such as specific data breach, botnet traffic monitoring, actual account abuse, customer report, and the like, may be indicated by different codes and may be stored at data field number 100.

A data field may be designated and agreed on by the parties to indicate a level of risk or a probability that a card account has been compromised. For example, data field number 110 may be selected to carry a numerical value indicating the risk level or the probability that the reported card account has been compromised. Other information, such as location, time, or date where the compromised card account was discovered, location, time, or date of incidents of abuse, other related card accounts, and the like may also be included in different data fields. Another data field also may be designated and agreed on by the parties to carry a description or comments regarding the compromised card account. Thus, additional comments or description may be included in the report of the compromised card account.

When an ISO 8583 transaction message includes information reporting a compromised card account, the respective bits in the bitmap of the message corresponding to the data fields that carry the respective information for reporting the compromised card account may be set to "1" to indicate that these data fields contain information to be extracted by the receiver, e.g., the card issuing bank. For example, if data field 60 is designated to carry information relating to the type of compromise, the bit corresponding to data field 60 in the bitmap may be set to "1" to indicate that there is information at data field 60 to be extracted by the receiver. Thus, the receiver of the message may check the bitmap to determine which data fields contain information to be extracted. Accordingly, various information for reporting a compromised card account, such as the card account number, the type of compromise, the source of discovery, the risk level, the probability of actual compromise, additional comments/description, and the like, may be inserted into respective data fields in an ISO 8583 transaction message.

At step 210, the merchant or the payment service provider may send the pseudo transaction message to the card issuing bank which issued the card account. The transaction message may be routed through a series of networks to reach bank server 142 of the card issuing bank. At 212, the merchant or the payment service provider may receive a responding message from the card issuing bank. The responding message also may be in the ISO 8583 format. In particular, one of the data fields of the responding message may be designated to indicate a receipt confirmation of the information reporting the compromised card account. For example, data field 120 may be designated and agreed on by the parties to indicate whether a report of a compromised account has been received. For example, the merchant or the payment service provider may check the data field 120 of the responding message received from the card issuing bank. If the data field 120 is "true," then the report is received by the card issuing bank. If the data field is "false," then the report is not received by the card issuing bank.

If the merchant or the payment service provider determines that the report of the compromised card has been received by the card issuing bank, the merchant or the payment service provider may remove usage restrictions from the compromised card account. Because the card issuing bank has been notified of the potentially compromised card account, the liability or risk has been shifted from the merchant or the payment service provider to the card issuing bank. As such, the merchant or payment service provider may rely on the card issuing bank to take appropriate actions or to make appropriate decisions regarding the approving the use of the card account. On the other hand, if the merchant or the payment service provider determines that the report of the compromised card has not been received by the card issuing bank, the merchant or the payment service provider may continue to restrict usage of the compromised card account. Because the card issuing bank has not been notified of the compromised card account, the merchant or the payment service provider may continue to bear some responsibility for fraudulent transactions conducted via the compromised card accounts. As such, the merchant or the payment service provider may continue to restrict the card account to prevent loss.

In an embodiment, the report of the compromised card account may be included in a pseudo ISO 8583 transaction message in which no real transaction is described, e.g., a transaction amount of zero. In another embodiment, the report of the compromised card account may be included in an actual ISO 8583 transaction message in which an actual transaction is descried. For example, when a customer has attempted to process a transaction using a potentially compromised card account at the merchant or at the payment service provider, the merchant or the payment service provider may generate an actual ISO 8583 transaction message to request authentication and authorization from the card issuing bank. The transaction message may include the card account number, the merchant or payment service provider's terminal ID, information for user authentication, PIN number, the amount of transaction and the like. The merchant or the payment service provider also may include information for reporting the compromised card account in the actual transaction message. For example, the type of compromise, the source of discovery, the risk level, the probability of actual compromise, and the like also may be included in the respective data fields of the actual transaction message. Because these data fields designated for reporting the compromised account are typically not used to carry information for actual transactions, the inclusion of the reporting information may not interfere with the regular functions of an actual transaction message.

When a card issuing bank receives a regular transaction message included with reporting of a compromised card account, the card issuing bank may analyze the report and the transaction request together to make appropriate decisions regarding whether to approve or decline the transaction request. If the card issuing bank determines that the transaction is legitimate and that the card account likely is not compromised in view of the report, the card issuing bank may send a responding ISO 8583 transaction message back to the merchant or the payment service provider indicating that the transaction request is approved and that the report has been received. Upon receiving the responding transaction message, the merchant or the payment service provider may read the responding transaction message and determine that the card issuing bank has been notified of the possible compromised card account but still approve the transaction. Thus, the merchant or the payment service provider may process the transaction, because the merchant or the payment service provider has the assurance that the card issuing bank is properly notified and that the merchant or the payment service provider may no longer bear the risk or liability of the compromised card account.

If the responding ISO 8583 transaction message from the card issuing bank indicates that the report has not been received, either because the card issuing bank is not a participant in the reporting program or because there is an error in the transmission process, the merchant or the payment service provider may cancel the transaction, because the card issuing bank is not properly notified and the merchant or the payment may still bear the risk or liability for the potentially compromised card account. In this case, even if the responding ISO 8583 transaction message indicates that the card issuing bank has approved the transaction request but the card issuing bank does not confirm the receipt of the report, the merchant or the payment service may still cancel the transaction to prevent loss.

By using the above process 200, a merchant or a payment service provider may embed a report of a potentially compromised card account in an ISO 8583 transaction message and send the ISO 8583 transaction message embedded with the report to the card issuing bank to notify the card issuing bank of the potentially compromised card account. Because the notification is transmitted via a normal transaction messaging system, no additional implementation is required. In particular, information for the report may be inserted in various data fields of the transaction message that are not used in a regular transaction message. Thus, the embedded report would not interfere with the regular processing of the transaction. Further, in response to receiving the report, the card issuing bank may respond with a responding ISO 8583 transaction message indicating that the report has been received.

Figure 3:
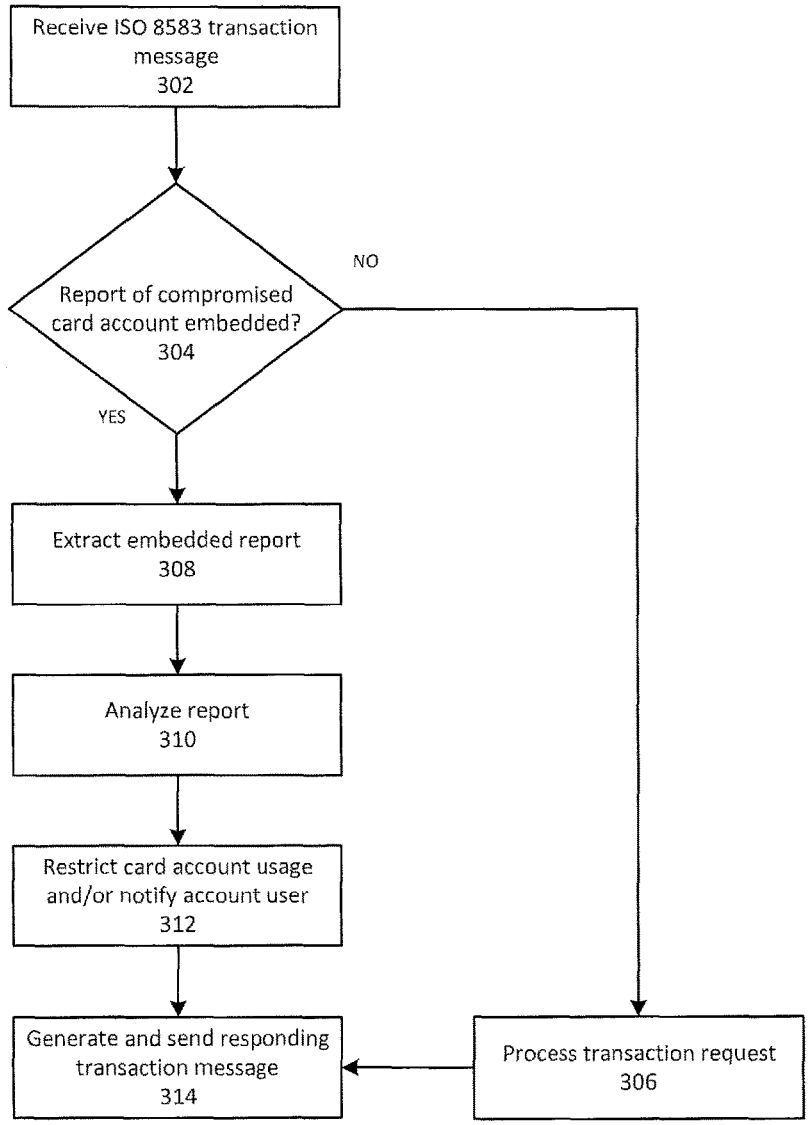
FIG. 3 is a flowchart showing a process for receiving a report of a compromised card account according to one embodiment.

FIG. 3 is a flowchart showing a process for receiving a report of a compromised card account according to one embodiment. Process 300 may be executed by a server, such as bank server 142, of a card issuing bank that is a participating member of the compromised card account reporting program. At step 302, the card issuing bank may receive an ISO 8583 transaction message from a merchant or a payment service provider. The card issuing bank may determine the type of transaction message based on the MTI of the received transaction message.

At step 304, the card issuing bank may determine whether the received transaction message is embedded with a report of a compromised card account. In particular, the card issuing bank may check the bitmap portion of the transaction message to determine whether data fields designated for reporting compromised card accounts contain information. For example, if data field 100 is one of the data fields designated for carrying information for the report, the card issuing bank may check whether the bit in the bitmap corresponding to data field 100 contains a "1" indicating that data field 100 contains information. In an embodiment, one bit in the bitmap may be designated as an indicator of whether the message contains a report of compromised card account. As such, the card issuing bank may check this bit in the bitmap to determine whether any reporting information is embedded in the message.

If the card issuing bank determines that no reporting information for a compromised card account is embedded in the transaction message, the card issuing bank may process the transaction request at 306. For example, the card issuing bank may perform normal authentication of the card account and authorization of the transaction using the card account. Based on whether authentication and the authorization are successful, the card issuing bank may approve or decline the transaction. At step 314, the card issuing bank may generate a responding ISO 8583 transaction message and send the responding transaction message back to the merchant or the payment service provider. In particular, the responding transaction message may include indication of whether the transaction request has been approved or declined.

If the card issuing bank determines that the reporting information for a compromised card account is embedded in the transaction message, the card issuing bank may extract the embedded report from the transaction message at step 308. A table or a list of data fields designated for carrying reporting information of a compromised card account may be used to find the embedded information. For example, the card issuing bank, the merchant, and the payment service provider may agree on a convention on how various reporting information should be embedded in an ISO 8583 transaction message. Specific data fields in the ISO 8583 transaction message may be designated for specific reporting information. For example, one data field may carry the type of compromise, one may carry the risk level, one may carry the probability that a card account is actually compromised, one may carry incidents of abuse, one may carry the source where the compromise was discovered, and other information relating to the compromised card account. Thus, the card issuing bank may extract the information from the respective data fields in the transaction message.

At step 310, the card issuing bank may analyze the report of the compromised card account. In particular, the card issuing bank may compare the report with the current status of the card account to determine whether the report reflects the current status of the card account. The card issuing bank also may determine how serious the report is and whether to take appropriate action to prevent loss or further fraudulent incidents. If the card issuing bank determines that the report is legitimate and that the card account has a high probability of being compromised, the card issuing bank may impose restriction on the card account at step 312. For example, based on the seriousness of the compromise, the card issuing bank may restrict the use of the card account to a certain geographic region or may restrict the use of the card account entirely. In an embodiment, the card issuing bank also may notify the user of the card account to confirm with the user whether the card account has been compromised. The user may be advised to cancel the card account and create a new card account.

At step 314, the card issuing bank may generate a responding ISO 8583 transaction message and send the responding message to the merchant or the payment service provider to confirm that the report of the compromised account has been received. For example, one of the data fields may be designated for confirming receipt of a report of a compromised card account. The card issuing bank may generate an ISO 8583 transaction message with an indication in the designated data field that the report has been received by the card issuing bank. The card issuing bank may send the responding transaction message to the merchant or the payment service provider.

In an embodiment, the ISO 8583 transaction message embedded with a report of a compromised card account may be a pseudo transaction message containing no actual transaction request, e.g., a transaction request of zero amount. In another embodiment, the ISO 8583 transaction message received from the merchant or the payment service provider may include both a transaction request and a report of a compromised account. In particular, the transaction request is for a transaction using the potentially compromised card account. The card issuing bank may analyze both the report of the compromised card account and the transaction request to determine whether the transaction request should be approved. If the risk is relatively low, the card issuing bank may still approve the transaction request in view of the report. As such, the card issuing bank may generate a responding ISO 8583 transaction message including an approval for the transaction request and a confirmation that the report has been received and may send the responding message to the merchant or the payment service provider. If the risk is high, the card issuing bank may decline the transaction request in view of the report. In this case, the card issuing bank may generate a responding ISO 8583 transaction message including a decline for the transaction request and a confirmation that the report has been received.

By using the above process 300, the card issuing bank may receive reports of compromised card accounts via ISO 8583 transaction messages. In particular, the card issuing bank may check a designated bit in the bitmap of the transaction message to determine whether an ISO 8583 transaction message contains reporting information for a compromised card account. The card issuing bank may analyze the report to determine appropriate actions to remedy the compromised card account. The received ISO 8583 transaction message embedded with the report may be a pseudo transaction message containing no actual transaction request or a regular transaction message containing both the report and an actual transaction request. The card issuing bank may generate and send a responding ISO 8583 transaction message back to the merchant or the payment service provider to confirm that the report has been received.

The above processes 200 and 300 may be implemented to send notification of a compromised card account from the merchant or the payment service provider to a card issuing bank. In another embodiment, the above processes 200 and 300 may be implemented to send notifications of compromised card accounts among merchants, payment service providers, banks, and other financial institutions to facilitate the flow of notifications of compromised card accounts among different financial institutions. Thus, various financial institutions may readily share intelligence or information on possible compromised card accounts to prevent loss due to fraud or abuse on various card accounts.

Figure 4:
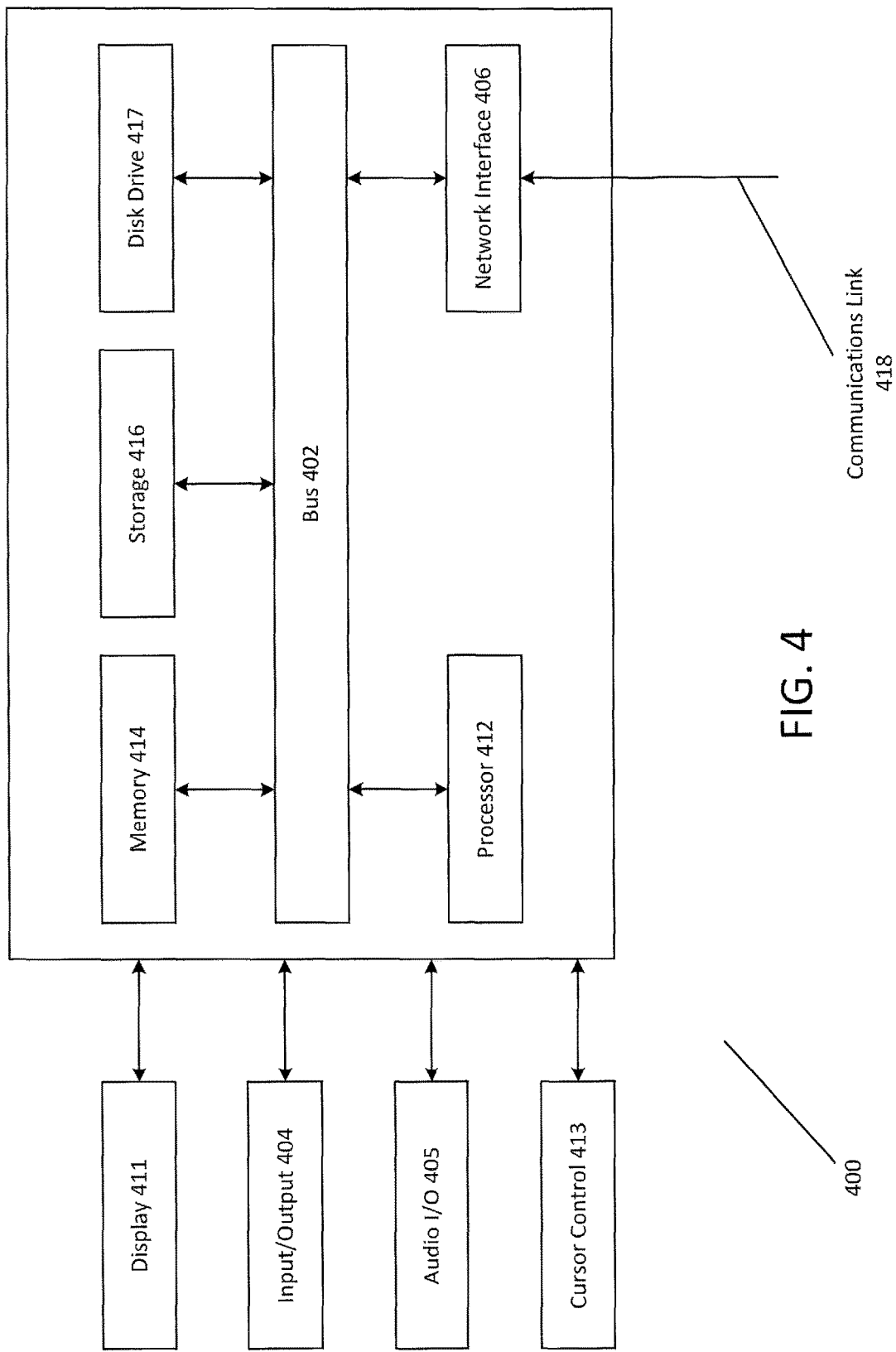
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio.

A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A server machine, associated with a first service provider, for detecting compromised user accounts, comprising:
    a non-transitory memory; and
    one or more hardware processors coupled to the non-transitory memory and configured to execute instructions from the non-transitory memory to cause the server machine to perform operations comprising:
        monitoring a plurality of online resources for information associated with user accounts;
        analyzing information collected from the plurality of online resources during the monitoring;
        detecting, by the first service provider based on the analyzing, a compromised user account maintained by a second service provider;
        automatically restricting use of the compromised user account with the first service provider;
        automatically generating and sending a first ISO 8583 security message to a different server machine of the second service provider, the first ISO 8583 security message comprising one or more first data elements comprising data reporting the compromised user account;
        receiving, after the sending the first ISO 8583 security message, a second ISO 8583 security message from the second service provider;
        analyzing the second ISO 8583 security message to determine that the second ISO 8583 security message comprises one or more second data elements indicating that the second service provider has received the data reporting the compromised user account; and
        responsive to the determining that the second ISO 8583 security message comprises the one or more second data elements indicating that the second service provider has received the data reporting the compromised user account, automatically removing the restriction of the use of the compromised user account with the first service provider.

2. The server machine of claim 1, wherein one or more of the one or more first data elements are unreserved ISO 8583 data elements and the first ISO 8583 security message further comprises a bitmap indicating a location of the first data elements within the first ISO 8583 security message.

3. The server machine of claim 1, wherein the data reporting the compromised user account includes one or more of: a type of compromise, a risk level, a probability that the user account is compromised, a source of the compromised user account, or a description of an incident of abuse.

4. The server machine of claim 1, wherein the first ISO 8583 security message comprises a pseudo-message unassociated with a pending transaction and comprising a transaction request of a zero amount, and wherein the second ISO 8583 security message further comprises a designated bit confirming receipt of the first ISO 8583 security message.

5. The server machine of claim 1, wherein the first data elements are located within at least one of data field numbers 55-63, 105-112, 114-123, and 127 of the first ISO 8583 security message.

6. The server machine of claim 1, wherein the first ISO 8583 security message is associated with a pending request, and wherein the second ISO 8583 security message comprises information regarding an approval decision associated with the pending request.

7. The server machine of claim 6, wherein the operations further comprise processing the pending request when the second ISO 8583 security message indicates that the pending request is approved by the second service provider.

8. The server machine of claim 6, wherein the operations further comprise declining the pending request when the second ISO 8583 security message indicates that the pending request is not approved by the second service provider.

9. A machine-implemented method comprising:
    receiving, by one or more hardware processors of a first server machine of a first party responsible for a user account, a first security message from a second server machine of a second party, wherein the first security message is in an ISO 8583 format and comprising one or more first data elements comprising data reporting the user account as being compromised;
    analyzing, by one or more of the hardware processors, the first data elements of the security message;
    identifying, by one or more of the hardware processors, the user account as being compromised based on the analyzing of the one or more first data elements;
    generating, by one or more of the hardware processors after the identifying the user account as being compromised, a second security message in an ISO 8583 format, the second security message comprising one or more second data elements indicating that the first party received the data reporting the user account as being compromised; and
    sending, by one or more of the hardware processors, the second security message to the second server machine.

10. The machine-implemented method of claim 9, wherein one or more of the first data elements in the first security message are unreserved ISO 8583 data elements and the first security message further comprises a bitmap indicating a location of the first data elements within the first security message based on ISO 8583.

11. The machine-implemented method of claim 9, wherein the second security message comprises an approval determination regarding a pending request involving the user account.

12. A non-transitory machine-readable medium having stored thereon machine-readable instructions executable to cause a machine to perform operations comprising:

analyzing information collected from one or more online resources;

detecting, based on the analyzing, a compromised user account maintained by another party;

automatically placing an account restriction on the compromised user account;

automatically generating and sending, to a server machine of the another party responsible for the compromised user account, a first ISO 8583 security message comprising one or more first data elements comprising a report identifying the compromised user account;

receiving, after the sending the first ISO 8583 security message, a second ISO 8583 security message from the another party;

analyzing the second ISO 8583 security message to determine that the second ISO 8583 comprises data indicating that the another party has confirmed receipt of the report identifying the compromised user account; and in response to the analyzing the second ISO 8583 security message confirming receipt of the report by the another party, automatically removing the account restriction.

13. The non-transitory machine-readable medium of claim 12, wherein the first ISO 8583 security message comprises a pseudo-message that is unassociated with any pending transaction comprising a transaction request of a zero amount.

14. The server machine of claim 1, wherein the monitoring of the online resources comprises monitoring live network traffic.

15. The server machine of claim 1, wherein the monitoring of the online resources comprises monitoring botnet communications over a network.

16. The server machine of claim 1, wherein the monitoring of the online resources comprises monitoring a plurality of online sites associated with cybercriminal activity.

17. The server machine of claim 1, wherein the automatically generating and sending of the first ISO 8583 security message is based, at least in part, on determining that the second service provider maintaining the compromised user account participates in a compromised user account reporting program.

18. The machine-implemented method of claim 9, wherein a logical value of one in a bit array data structure of the first security message indicates that a corresponding data element among the one or more data elements includes information about the user account.

19. The machine-implemented method of claim 9, wherein the first data elements are located within at least one of data field numbers 55-63, 105-112, 114-123, and 127 of the first ISO 8583 security message.

20. The machine-implemented method of claim 19, wherein the first data elements are located within at least one of data field numbers 55-63, 105-112, 114-123, and 127 of the first ISO 8583 security message, and wherein the first ISO 8583 security message further comprises a bitmap indicating the location of the first data elements within the first ISO 8583 security message.

\* \* \* \* \*